Oct. 9, 1934.  F. A. FIRESTONE ET AL  1,976,337
APPARATUS FOR DETERMINING ROUGHNESS OF SURFACES
Filed March 6, 1931  2 Sheets-Sheet 1
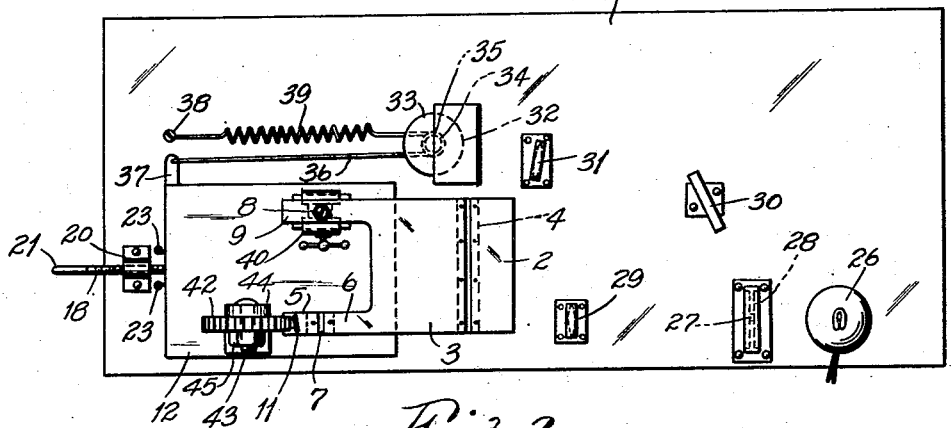
Fig. 1.
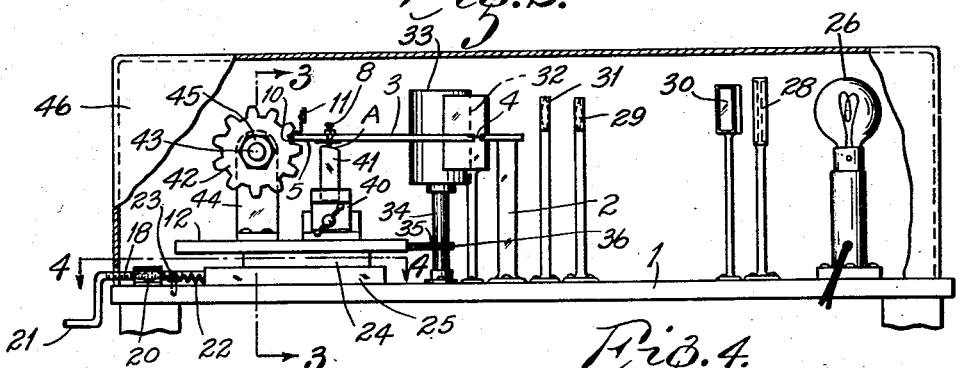
Fig. 2.
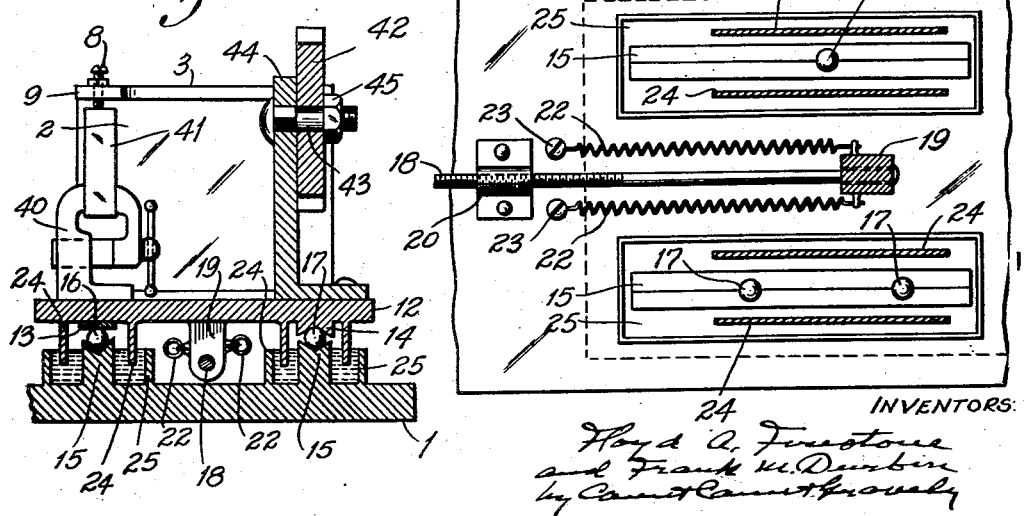
Fig. 3.
Fig. 4.
INVENTORS:
Floyd A. Firestone
and Frank M. Durbin
by Carr and Carr Knowly
THEIR ATTORNEYS.

Oct. 9, 1934.     F. A. FIRESTONE ET AL     1,976,337
APPARATUS FOR DETERMINING ROUGHNESS OF SURFACES
Filed March 6, 1931     2 Sheets-Sheet 2
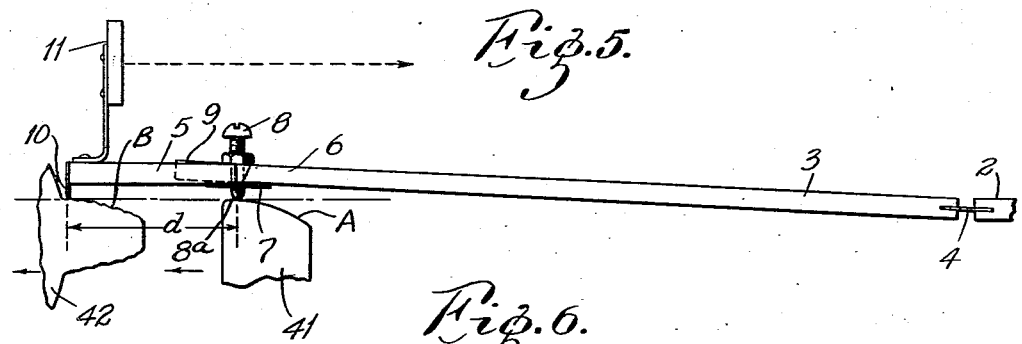
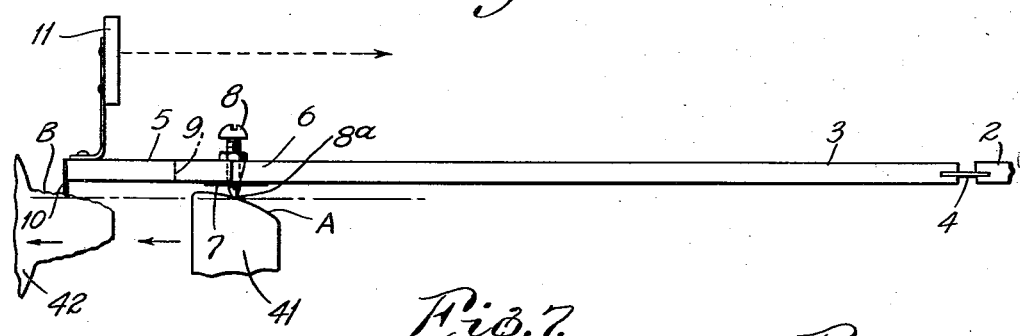
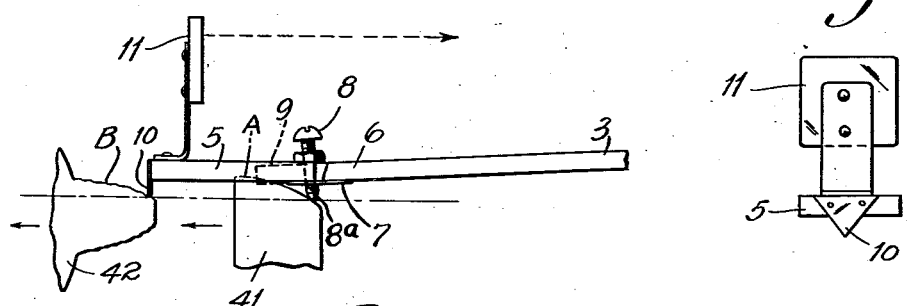
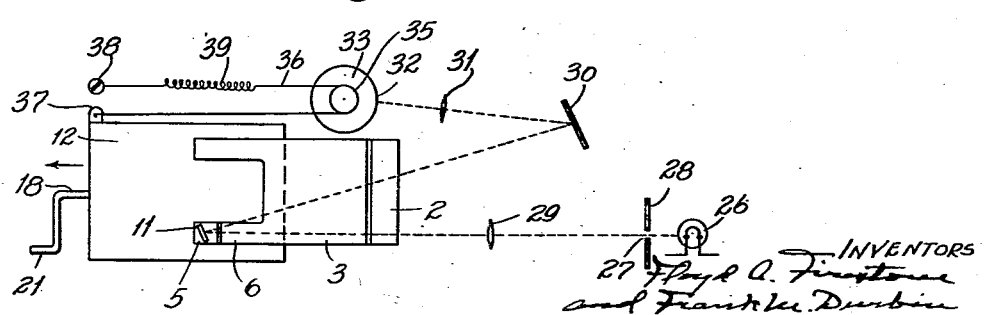
INVENTORS
Floyd A. Firestone
and Franklin Durbin
THEIR ATTORNEYS Patented Oct. 9, 1934

1,976,337

UNITED STATES PATENT OFFICE 1,976,337

APPARATUS FOR DETERMINING ROUGHNESS OF SURFACES

Floyd A. Firestone, Ann Arbor, Mich., and Frank M. Durbin, Stillwater, Okla.

Application March 6, 1931, Serial No. 520,756

15 Claims. (Cl. 73—51)

Our invention relates to apparatus for detecting and indicating irregularities of surfaces, such, for instance, as small irregularities left by machining or similar operations; and the principal object of this invention is to devise apparatus for indicating or measuring the roughness of surfaces whether plane or curved, and which will not be affected by the curvature of such surfaces.

Our invention consists principally in apparatus whereby one surface can be compared with a true surface of the same nominal shape and the results of the comparison indicated. Our invention further consists in apparatus whereby lines are traced simultaneously across like portions of one surface and of a true or master surface of the same shape, said apparatus including means for indicating the differences in the lines thus traced.

In the accompanying drawings which form part of this specification and wherein like reference symbols refer to like parts wherever they occur, Fig. 1 is a plan view of apparatus embodying our invention with the cover removed, Fig. 2 is a side elevation of said apparatus with parts of the cover broken away, Fig. 3 is a vertical sectional view taken on the line 3—3 of Fig. 2, Fig. 4 is a horizontal sectional view taken on the line 4—4 of Fig. 2 with the cover removed.

Fig. 5 is an enlarged detail view of the tracing mechanism in its initial position and showing the work contact element engaging the surface of a gear tooth, the size of which is slightly enlarged, Fig. 6 is a view similar to Fig. 5 showing the position of the tracing mechanism after a portion of the tracing operation has been completed, Fig. 7 is another similar view showing the position of the tracing mechanism when the tracing operation is about finished.

Fig. 8 is a front elevation of the tracing mechanism and work contact element, and, Fig. 9 is a diagrammatic plan view of the apparatus with the cover removed showing the arrangement of indicating and recording means.

Rigidly mounted on a base 1 is an upstanding support 2 which has a horizontally disposed arm 3 flexibly secured thereto by means of a thin hinge strip 4 of spring material such as phosphor bronze. The arm 3 has a U-shaped end and an elongated flat block 5 is flexibly secured to the end of one branch 6 of said arm by means of a second hinge strip 7 of material similar to that of strip 4. An adjustment screw 8 extends through the other branch 9 of said arm 3 and has threaded engagement therewith. Said adjustment screw is mounted opposite and at right angles to the axis of the hinge 7 and is provided with a spherical lower end portion 8a hereinafter termed the following or master contact element point. Mounted on the free end of the elongated flat block 5 is a pointed member work contact element 10, and a vertically disposed mirror 11 is mounted on the top of said block.

Mounted on the base 1 and overhung by the arm with the U-shaped end is a movable plate 12 upon the under side of which are provided a longitudinal flat track 13 near one side and a V-way track 14 running parallel thereto on the other side; and provided on the base 1 are a pair of parallel V-way tracks 15 adapted to cooperate with the trackways 13 and 14 provided on the underside of the movable plate 12. A steel ball 16 is interposed between the flat upper track 13 and lower V-way track 15 on the one side of said plate, and two steel balls 17 are interposed between the V-way track 14 and the V-way track 15 on the other side, the single steel ball 16 being located substantially midway between the two balls 17. Obviously, this arrangement provides for a three point mounting of the movable plate and constrains the same to travel in a straight line without looseness or side sway of any kind and with very little friction.

Movement of said plate 12 is accomplished by means of a worm screw 18 which is fastened to a block 19 projecting from the under side of said plate midway between the two tracks and has threaded engagement with a block 20 provided on the base 1 near the end thereof. A suitable crank handle 21 is provided on the end of said worm screw. Preferably a coil spring 22 is secured to the block 19 on the under side of the movable plate on each side of said worm and to a screw 23 extending from the base 1 on each side of block 20. Projecting from the under side of the movable plate on each side of each track are plates or skirts 24 which extend into oil receptacles 25 provided on the base in a position to receive them. Obviously, this arrangement prevents foreign matter from lodging in the V-ways and clogging the tracks.

Indicating means responsive to movements of the work contact element comprise a heated filament 26 which throws light through a slit 27 in an opaque member 28 interposed between said filament and the mirror 11 provided on the tracing mechanism. A beam of light (shown by dotted lines in Fig. 9) which emerges from said slit 27 passes to a lens 29 which focuses the same on said mirror 11 which in turn reflects it to a second mirror 30 mounted on the base 1 in a position to receive the same. This second mirror in turn reflects said beam to a lens 31 which in turn focuses the same on a small screen 32 provided on a rotatably mounted drum 33. Said drum is rigidly mounted on a rotatable vertical shaft 34 extending from the base 1 on which the apparatus is mounted and said shaft 34 is provided with a small pulley 35 near its bottom. Mounted around said pulley is a flexible cable 36 having one end attached to a projection 37 extending from the movable plate 12 and the other end to a screw 38 extending from the base 1 substantially opposite projection 37. Interposed between the pulley on the shaft 34 and the screw 38 in the base 1 is a suitable coil spring 39 which promotes proportionate conjoint movement of the rotatable drum 33 and the plate 12.

Mounted on the movable plate 12 is a vise 40 which is adapted to hold a master form 41 having a true surface A which is in position to engage and support the spherical lower end portion or master contact element 8a of the adjustment screw 8 provided on the horizontally disposed arm 3. In practice the supporting surface of the master form is made true enough for testing purposes by suitable polishing and is checked by preliminary tracing until the master contact element rides thereon without producing small "wiggles" in the mirror. Also provided on the movable plate 12 are suitable means for supporting a part 42 provided with a surface B whose roughness is to be determined. In the construction illustrated we have shown the surface B as the contacting peripheral portion of a gear tooth. The gear 42 provided with the surface B is mounted on a small horizontal shaft 43 extending from a vertical bracket 44 secured to the movable plate 12 and said gear is rigidly held on said shaft by means of a nut 45. For testing purposes the surface whose roughness is to be determined is disposed parallel to the surface A provided on the master form and located a horizontal distance (d) from it equal to the horizontal distance from the work contact element to the axis of the hinge. Since the spherical lower end portion of the adjustment screw is also mounted in line with the axis of the hinge 7 then (d) also represents the longitudinal horizontal distance from the work contact element to the spherical following point of the adjustment screw.

It is extremely difficult to detect and indicate exceedingly small imperfections because an apparatus, which is sensitive enough to measure minute imperfections of a few hundred thousandths of an inch must be provided with an indicating mechanism which, unless provided with a recording range of extremely wide limits, is incapable of including changes in the normal shape of the surface whose roughness is to be determined.

Our apparatus, however, does not record movements of the tracing mechanism due to the normal curvature of the surface traced as the master form having the true surface and the following point which it supports eliminates the effect of such curvature. With our apparatus, as clearly shown in Figs. 5, 6 and 7, a beam of light which is transmitted by the indicating means to the recording drum, does not run off of the small receiving screen during a tracing operation because the only movements indicated on said screen depend upon the relative difference in height of the work contact element and the following master contact element and are independent of the position of arm and the absolute height of the work contact element.

The operation of the apparatus is as follows: The master form whose true surface is of the same normal shape as the surface whose roughness is to be determined is mounted on the movable plate 12. The part whose surface roughness is to be determined is then mounted on said plate so that it extends parallel to the true surface of the master form and is disposed from it a distance (d) equal to the horizontal distance from the work contact element to the axis of the hinge 7. When so positioned it is obvious that the work contact element will engage a point on the surface B corresponding to a like point on the true surface A. The work contact element is then placed at a convenient spot preferably about the middle of the surface whose roughness is to be determined and the adjustment screw is adjusted so that the horizontally disposed arm and the block carrying the work contact element are approximately level. The indicating system is then adjusted so that the spot of light is sharp and falls near the middle of the receiving screen provided on the rotatable drum. A line across the surface, whose roughness is to be determined, is then traced by rotating the crank handle of the worm screw until the work contact element covers the desired distance over the surface and the exact number of turns of the crank handle are noted. During this preliminary operation, the spot of light is also visually observed, and if it runs off the screen, suitable adjustments are made to keep it on the screen.

After all adjustments are made, the receiving screen is loaded with light sensitive film, a cover 46 for excluding extraneous light is placed over the entire apparatus, and the crank handle rotated the proper number of turns. The beam of light reflected from the indicating means causes a photographic reaction on the moving film which produces a graphical record on the film when it is developed which is in the nature of a line with deviations from straight portions thereof representing imperfections of the surface along the line traced. Obviously, as many lines as necessary may be traced across different portions of the surface to determine the roughness thereof in accordance with the purposes desired; and it is to be understood that in tracing lines across the surface there is no actual mark made on the gears by the contact element, but this merely refers to the path or line along which the contact element moves and measurements are taken. In determining the roughness of the gear tooth surface, as described, a single line traced across the middle of the surface has been found to be sufficient for purposes of rejection and the like.

Obviously numerous changes may be made in the apparatus and we do not wish to be limited to the particular construction shown and described.

What we claim is:

1. In apparatus for determining the surface rougness of an object by comparison with the trued surface of a master form, a support, an arm flexibly mounted thereon adjacent one end, a second arm flexibly mounted on the free end of the first mentioned arm and having a contact element for engaging the surface of the object, and means extending from said first mentioned arm for contacting with the surface of the master form.

2. In apparatus for determining surface roughness of an object, a base, a support thereon, an arm hinged to said support, and a member hinged to said arm and having a contact element for engaging a surface.

3. Apparatus for determining the surface roughness of an object comprising a base, a support mounted thereon, an arm secured to said support by means of an elastic hinge, a flat block member secured to said arm by means of a second elastic hinge, said flat block member having a contact element for engaging the surface of an object, means for moving the object while said contact element is maintaining contact with its surfaces, a mirror mounted on said block member and an indicator operatively related to said mirror.

4. In apparatus for determining the surface roughness of an object, a contact element, means for maintaining contact thereof with the surface of the object throughout a line of testing, an indicator, a mirror fixed in relation to said contact element in position to reflect a beam of light to said indicator, and means for supporting the object and moving it past said contact element and in operative relation thereto in such manner that the mirror and indicator respond only to deviations from the true pattern of the object.

5. Apparatus for determining the surface roughness of an object comprising a base, a support mounted thereon, an arm hinged to said support, a block member hinged to said arm and having a contact element for engaging a surface, means for moving an object whose surface roughness is to be determined with respect to said contact element to cause said contact element to move across its surface, an indicator, a mirror mounted on said block member in position to reflect a beam of light to said indicator, and means for changing the angular position of said arm during a roughness determining operation so as to prevent the normal curvature of the surface of said object from affecting the angle of reflection of said mirror.

6. Apparatus for determining the surface roughness of an object comprising a support, an arm hinged thereto, a block member hinged to said arm and having a contact element for engaging the surface of an object, and a second contact element extending from said arm for engaging the true surface of a master form.

7. In apparatus for determining surface roughness, a base, a support mounted thereon, an arm flexibly secured to said support, a member having a contact element for engaging a surface hinged to said arm, an adjusting member having a spherical end portion extending from said arm and movable means provided on said base for supporting a master form having a true surface in position to engage the spherical end portion of the adjusting member.

8. In apparatus for determining surface roughness, a base, a support mounted thereon, an arm flexibly secured adjacent one end to said support, a member having a contact element secured to the free end of said arm by means of a hinge, an adjusting member having a spherical end portion extending from said arm, said hinge and said adjusting member being substantially equidistant from the axis of flexure of said arm, and movable means provided on said base for mounting a master form having a true surface in position to engage the spherical end portion of the adjusting member.

9. Apparatus for determining the surface roughness of an object comprising a base, a support mounted thereon, an arm flexibly secured to said support, a member having a contact element flexibly secured to said arm, an adjustment screw mounted on said arm, said adjustment screw and the axis of flexure of said member on said arm being equidistant from the axis of flexure of said arm on said support, a movable plate mounted on said base in position to be overhung by said arm, means provided on said base for holding a master form having a true surface for engaging the end of said adjustment screw and supporting said arm and other means provided on said movable plate for supporting the object whose surface roughness is to be determined.

10. Apparatus for determining the surface roughness of an object by comparison with the trued surface of a master form for said object comprising a base, a support mounted thereon, an arm flexibly secured adjacent one end to said support, a block member flexibly secured to the free end of said arm and having a pointed contact element, a mirror mounted on said block member, means for throwing a beam of light on said mirror, a receiving screen operatively related to said mirror for receiving the beam of light reflected from said mirror to indicate movements of said contact element, an adjusting member having a spherical end portion porjecting from said flexibly mounted arm in such position that the center point of its spherical end portion is located in a plane perpendicular to said arm and passing through the hinge line of said block member, and movable means provided on said base having means thereon for supporting the object in such position as to have its surface contacting with said contact element, said movable means having other means thereon for supporting the master form in such position that its surface extends parallel to the surface of the object and is disposed from it a distance equal to the perpendicular distance between a plane perpendicular to said arm and passing through the hinge line of the block member and a parallel plane passing through the contact element whereby the spherical end portion of the adjustment member will engage a point on the surface of the master form corresponding to a point on the surface of the object.

11. Apparatus for determining the surface roughness of an object comprising a horizontally disposed base, an upright support mounted thereon, a horizontally disposed arm flexibly mounted adjacent one end on said support, a block member flexibly mounted on the free end of said flexibly mounted arm and having a contact element, a vertically disposed mirror mounted on the top of said block member, means for producing and directing a beam of light to said mirror, a receiving screen operatively related to said mirror in position to receive a beam of light reflected from said mirror to indicate tilting movements thereof, an adjusting member carried by and projecting below said arm whose end portion is located in a plane perpendicular to said arm and passing through the hinge line of the block member, a movable plate mounted on said base, a master form having a true surface upon which the end portion of the adjusting member rests, and means provided on said movable plate for mounting an object, a portion of whose surface is of the same nominal shape and size as the surface of the master form and in such position that its surface is disposed parallel to that of the true surface of the master form and located from it a distance equal to the horizontal distance between the hinge line of the block member and the contact element.

12. Apparatus for determining surface roughness of an object comprising, a base, a movable plate provided with a pair of parallel tracks, one of said tracks having a V-way and the other a flat way, a pair of parallel V-way tracks mounted on said base for cooperating with the tracks on said movable plate, balls interposed between one set of cooperating tracks, a single ball interposed between the other set of tracks, means on said movable plate for supporting the object, mechanism mounted on said base having a contact element for engaging the surface of said object and means for indicating movements of said contact elements.

13. Apparatus for determining surface roughness of an object comprising, a base, a movable plate provided with tracks, tracks provided on said base for cooperating with the tracks on said movable plate, balls interposed between the cooperating tracks and a worm screw secured to said plate and having threaded engagement with said base, and a coil spring secured to said plate and said base, means on said movable plate for supporting the object, mechanism mounted on said base having a contact element for engaging the surface of said object and means for indicating movements of said contact elements.

14. Apparatus for determining the surface roughness of an object comprising, a base, a track provided on said base, a plate having a track thereon cooperating with the track on said base, a ball interposed between the set of tracks, a skirt projecting from said plate on each side of said track and an oil reservoir provided on each side of said track on said base in a position to receive the skirt extending from said movable plate for excluding foreign matter from the set of tracks, means on said movable plate for supporting the object, mechanism mounted on said base having a contact element for engaging the surface of said object and means for indicating movements of said contact elements.

15. Apparatus for determining the surface roughness of an object comprising a base, a support mounted thereon, an arm hinged to said support, a member hinged to said arm and having a contact element for moving across the surface of an object while maintaining contact therewith, a mirror mounted on said member, light producing means provided on said base, an opaque member interposed between said light producing means and said mirror and having a slit therethrough for allowing a ray of light to reach said mirror, a lens interposed between said opaque member and said mirror for focusing the ray on said mirror, a second mirror in position to receive the beam of light as it is reflected from said mirror, a receiving screen in position to receive the ray of light as it is reflected from said second mirror, and a lens interposed between said second mirror and said receiving screen for focusing said ray of light on said screen.

FLOYD A. FIRESTONE.
FRANK M. DURBIN.